March 8, 1960

R. W. LITTLE 2,927,401

TREE INJECTOR CUTTING BIT

Filed Dec. 5, 1958

Reuel Winfred Little
INVENTOR.

BY *[signatures]*
Attorneys

2,927,401
TREE INJECTOR CUTTING BIT

Reuel Winfred Little, Madill, Okla.

Application December 5, 1958, Serial No. 778,497

10 Claims. (Cl. 47—57.5)

The present invention relates, broadly construed, to tree injectors, but has reference in particular, to a cutting bit or blade which is expressly constructed, designed and otherwise made with the utmost in precision to adapt it for use on tree injectors or inoculators.

More particularly, the concept has to do with a structurally and functionally novel cutting bit or blade which lends itself to practical and reliably efficient use on tree injectors of the construction disclosed, for example, in Patents 2,770,920 of November 20, 1956, and 2,803,924 of August 27, 1957, granted to me. Briefly, these prior patents, if examined, and it is thought that they should be, show an elongated barrel which is of a length to provide the necessary reach for handling by a man of average height while standing up, the necessary length while it is being lifted and then vigorously plunged forwardly and downwardly at the requisite angle in the direction of the base of the tree. The barrel is of a weight that it is neither too light nor too heavy thus enabling the user to throw it forcibly and land and drive the cutter blade through the tree's outer bark and into the cambium layer. The improved cutting blade is solid and fantail-shaped in plan. The cutting edge of the blade penetrates and cleaves not only through the bark but cuts a pocket in the tree into which a prescribed amount of fluid chemical is fed and to, in this manner, impregnate the tree.

It will also be noticed that the stated prior patents utilize a blade or bit wherein the front concave surface of the blade traps and delivers the fluid, which flows by gravity, into the impregnating pocket. Also, the body portion proper of the blade is provided with a suitably graduated bore or passage which communicates operatively with the valved lower end construction on the aforementioned barrel. In addition, a recess, called a fluid pooling cavity, is provided at the median portion of the concavity in the blade proper.

After having made and repeatedly used these patented injectors in countless instances, it became increasingly evident that the precise manner in which a cutting bit or blade is contoured, delineated and constructed, is highly significant. As a matter of fact it is believed that the cutting blade is by and large the most important part or unit of an injector. Experience has shown that even a slight deviation in any facet of the blade's surface, even though involving a fraction of an inch or so, can make the difference between failure and success in expeditiously forming the ever important pocket in the trunk of the tree. The significance of the statements being made will become apparent and appreciated when one considers that a workman using the injector when it is functioning properly can inject some three thousand or more trees during the course of a day.

One objective in the instant matter is to better solve the problems which have repeatedly come up for consideration and practical disposition. For example, it should be noticed that the curvate cutting edge is distinct in that the central or crown portion provides a leading edge functioning in conjunction with the other features of the bit. Certain cutting blades, unlike the one herein disclosed, require the workman to move close to and virtually up against the tree and many times since brush and green briars are in the way, it is difficult to slant and throw the barrel at the required angle to make a good pocket. Sometimes it is necessary to lift the injector after the first stroke and raise it up and attempt to drive the desired pocket. Unless the surfaces of the bit are properly angled in respect to the desired areas in the front of the bit or blade the latter will carom off or otherwise bounce and rebound, making it necessary to start over at a new spot at the base of the tree.

Obviously, it is another object of the invention to define and provide blade surfaces which are critical and correctly contoured so that they function conjointly in providing practical application and utilization of the same. With the improved construction the bit accepts and takes the strain and imposes the pressure of the thrust in such a manner that glancing and ineffectual blows are minimized.

Numerous other objects, features and advantages will become more readily apparent from the following description and the accompanying illustrative, but not restrictive, drawing.

In the drawing, wherein like numerals are employed to designate like parts throughout the views.

Briefly summarized, the improved bit or blade is characterized by a solid body of requisite mass which is generally fantail-shaped in plan, said body having an upper portion provided with an axial open ended bore which is progressively reduced in cross-section from its upper intake end to its lower fluid discharge end in a manner to effectually apportion and regulate the gravitation of the controlled amount of fluid which is caused to pass therethrough, an upper half-portion of said body having a neck provided with an axial screw-threaded attaching and retaining shank, the upper end of said neck being provided with circumferentially disposed flat faces, a tool gripping collar, the lower half-portion of said body being progressively widened and concavo-convex and terminating in a feathered cutting edge, the concave side defining the front of the blade and the convex side the back of the same, the discharge portion of said bore communicating and emptying into the concavity embodied in said concave side, and the front of said neck below said collar having a flattened declivity aligned with the upper portion of said concavity, said declivity constituting an impact control and blade landing abutment which takes the strain, guides and controls the stroke of the blade and minimizes the likelihood of the blade glancing sidewise or rebounding undesirably.

Figure 1:
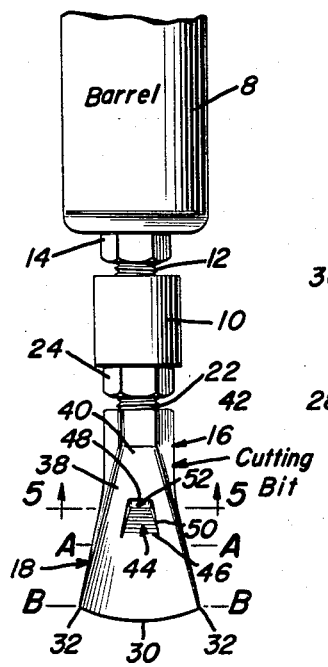
Fig. 1 is a front elevation of the improved cutting bit or blade constructed in accordance with the principles of the invention and showing how it is coupled in readiness for use with a fluid containing barrel, for example, the type of barrel disclosed in the aforementioned patents.
Figure 2:
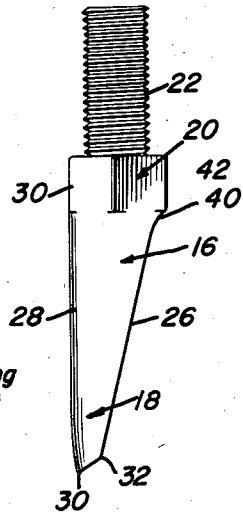
Fig. 2 is a view on an enlarged scale of the cutting bit by itself observing the construction of the same from one lengthwise side or edge.
Figure 3:
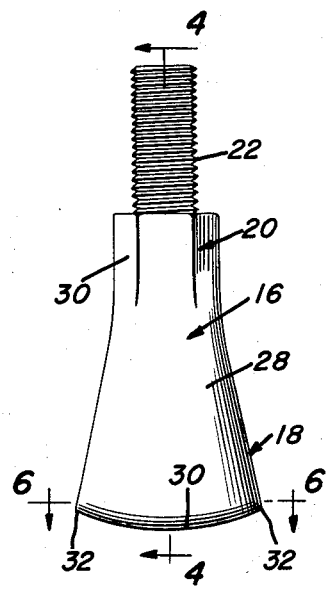
Fig. 3 is a plan or elevational view of the back of the blade or bit.
Figure 5:
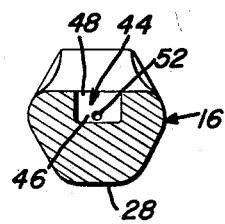
Fig. 5 is a section on the plane of the line 5—5 of Fig. 1.
Figure 6:
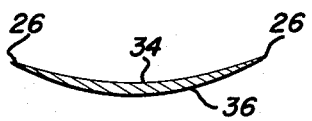
Fig. 6 is a section on the line 6—6 of Fig. 3.

With reference to Fig. 1, the numeral 8 designates a tree injector barrel to the lower end of which a coupling 10 is connected by way of a screw-threaded connector 12 and lock nut 14. The improved cutting bit is of one piece solid metal construction, except for the bores, and it is fantail-shaped in plan. With reference again to Fig. 1, the line A—A is an imaginary line which is used here to divide the over-all body of the bit into upper and lower half portions, the upper half-portion being more specifically designated as a neck 16 and the remaining or lower half portion as the cutting blade 18. The neck is non-circular in cross-section as seen in Fig. 5 and the upper end portion thereof is fashioned into a collar or head 20 having circumferentially arranged flat faces and forming what is equivalent to a tool grip or nut. Extending axially from the collar and above it is a reduced screw-threaded shank 22 which cooperates with the coupling 10 and is retained by an assembling and locking nut 24. It will be noted (Fig. 2) that the lengthwise forwardly and outwardly diverging edges are substantially straight as at 26 and assume an oblique angle relative to the straight lengthwise back portion 28. This back portion is in line and substantially flush with one of the flat faces 30 on the collar. However, the lower or forward end slopes slightly toward and joins with the central high crown portion or leading lip 30 which provides the arcuately contoured or curvate cutting edge seen in Fig. 3. The imaginary line B—B in Fig. 1 helps to define the curvature in relation to the receding corners 32. This leading end portion of the blade 18 is concavo-convex in cross-section as seen in Fig. 6. The front concavity is denoted at 34 and the back convexity at 36.

Figure 4:
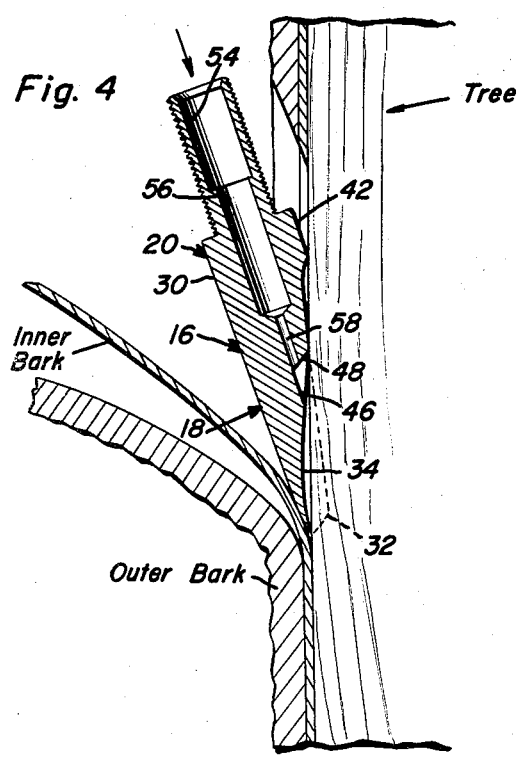
Fig. 4 is a central sectional view taken on the plane of the line 4—4 of Fig. 3, looking in the direction of the arrows, and also showing the approximate manner in which the cutting edge cleaves or cuts through the outer and inner bark in a manner to cut a pocket and to then charge the pocket with fluid (not detailed).

While the straight back 18 which is approximately parallel to the lengthwise axis of the bit and the oblique angled edges 26 are important, as is the leading crown or lip 30, other facets of the front side of the body are predominantly important. More particularly, the essential part of the face of the neck 16, that is the part 38 (Fig. 1) is plain and smooth and is beveled and defines a declivity. This declivity constitutes a special purpose stabilizing and aiming abutment. The divergent edge portions of the declivity line up and match with the diverging edge portions 26. The upper narrower end portion 40 is in line with the cooperating flat face 42 of the collar. In fact, this portion merges at the point 40 into the flat face 42 as shown, perhaps best, in Fig. 2. It is further significant to note the depression 44 which is centrally located and defines a fluid collecting or pooling well. This well may be said to be substantially trapezoidal in outline or shape. The bottom 46 communicates and empties into the concavity 34. There are three walls around the margin and these constitute a top wall 48 and outwardly and downwardly diverging side walls 50. These several walls serve to deliver the fluid and to spread it and distribute it so that it may be allowed or caused to gravitate with assurance into the pocket which is to be cut or formed in the tree. The numeral 52 designates the discharge end of a bore or passage. This bore is best seen in Fig. 4 where it will be observed that it is extended axially through the body. In fact, the bore is graduated providing an upper larger intake end or portion 54, a slightly reduced portion 56 and a restricted passage or portion 58. It is the latter portion which provides a port which discharges into the well permitting the fluid to flow from the well into the concavity in an obvious manner.

It is repeated that certain features of superiority of construction have to do with the straight back 28. Secondly, the declivity, which forms the abutment 38, is important in that it provides stability and minimizes bouncing. The angle of this abutment has been carefully worked out to assist the cutting edge in penetrating the outer bark and inner bark and so that the surface of the abutment 38 slides against the inner tree, making the desired pocket. The cutting edge is angled so that it will take to the tree and penetrate easily.

The curvature of the cutting edge is such that it penetrates the outer bark and inner bark and slides down between the inner and outer bark and inner tree making the pocket with the port which discharges into the center of the well 44, that is the end portion 52 is correctly sized to ensure superior results. Experience has shown that a bit as constructed will enable a good workman to do approximately six hundred and forty acres of trees if and when properly used. It is also to be stressed that the cooperation of the surfaces 38 and 34 and the intervening ported well 44 cooperate in such a manner that it is almost impossible to stop up the passage or to interfere with effectual inoculation of the trees which have been injected.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. For use on and in conjunction with a tree injector having an elongated barrel suitably valved and provided with means on its lower end for the attachment thereto of a cutting bit; a bark cleaving and penetrating bit comprising a body of requisite weight generally fantail-shaped in plan, said body having an upper portion provided with an axial open ended bore progressively reduced in cross-section from its upper intake end to its lower fluid discharge end to effectually apportion and regulate the gravitation of the controlled amount of fluid which is caused to pass therethrough, an upper portion of said body having a neck provided with an axial screw-threaded attaching and retaining shank, the upper end of said neck being provided with circumferentially disposed flat faces and constituting a tool gripping collar the lower portion of said body being progressively widened and concavo-convex and terminating in a feathered cutting edge, the concave side defining the front of the blade and the convex side the back of the same, the discharge portion of said bore communicating with the concavity of said concave side, and the front of said neck below said collar having a flattened declivity aligned with the upper portion of said concavity, said declivity constituting an impact control and bit landing abutment which takes the strain, guides and controls the stroke of the blade and minimizes the likelihood of the bit glancing sidewise or rebounding undesirably.

2. The structure defined in claim 1, and wherein said declivity merges at its longitudinal sides and bottom with cooperating portions of the lower portion and merges at its top with one of the flat faces of said collar.

3. The structure defined in claim 2, and wherein the central part of the lower portion of the declivity is provided with a complemental depression defining a well, the discharge end of said bore emptying into said well.

4. The structure defined in claim 2, and wherein the central part of the lower portion of the declivity is formed with a complemental depression defining a shallow well, the discharge end of said bore emptying into said well, said well gradually decreasing in depth and increasing in width downwardly in a manner to effectually deliver and distribute the liquid into said concavity.

5. For use on and in conjunction with a tree injector having an elongated suitably valved barrel with means on its lower end to provide for the attachment thereto of a cutting bit; a bark cleaving and penetrating bit comprising a solid body of requisite mass which is generally fantail-shaped in plan, said body having an upper portion provided with an axial open ended bore which is progressively reduced in cross-section from its upper intake end to its lower fluid discharge end in a manner to effectually apportion and regulate the gravitation of the controlled amount of fluid which is caused to pass therethrough, an upper half-portion of said body having a neck provided with an axial screw-threaded attaching and retaining shank, the upper end of said neck being provided with circumferentially disposed flat faces and constituting a tool gripping collar the lower half-portion of said body being progressively widened and concavo-convex and terminating in a feathered cutting edge, the concave side defining the front of the blade and the convex side the back of the same, the discharge portion of said bore communicating with the concavity embodied in said concave side, and the front of said neck below said collar having a flattened declivity aligned with the upper portion of said concavity, said declivity constituting an impact control and blade landing abutment which takes the strain, aims and controls the stroke of the blade and minimizes the likelihood of the blade glancing sidewise or rebounding undesirably, the median longitudinal portion of said back being approximately straight and the upper part thereof being flattened and gradually sloping in a plane relative to the cooperating flat face on said collar with which it is aligned.

6. A bark cleaving and penetrating bit for use on a tree injector comprising a solid body of predetermined weight generally fantail-shaped in plan, the upper part of said body being axially bored, having a neck, at the upper end of which, is an axial attaching shank, the part of the body below said neck having a concave front and terminating in a thin curvate cutting edge with a central crown providing a leading lip, the longitudinal central portion of said blade being generally straight but sloping slightly toward and merging with said lip, the front of said neck having a flattened declivity aligned with the upper portion of said concave front, said declivity constituting an impact control and blade landing abutment which takes the strain, guides and controls the stroke of the blade and minimizes the likelihood of the blade glancing sidewise or rebounding undesirably when it is being used.

7. The structure defined in claim 6 and wherein said declivity merges at its longitudinal sides and bottom with cooperating portions of the lower portion of said body and merges at its top with a cooperating portion of said neck.

8. The structure defined in claim 7, and wherein the central part of the lower portion of the declivity is formed with a complemental depression defining a shallow well, the discharge end of said bore emptying into said well.

9. The structure defined in claim 8, and wherein said well gradually decreases in depth and increases in width downwardly in a manner to effectually deliver and distribute gravitating fluid into the communicable concave portion of said front.

10. For use on and in conjunction with a tree injector, a bark cleaving trunk penetrating bit comprising a body of predetermined weight approximately fantail-shaped in plan, having an upper portion provided with an axial open-ended bore, an upper portion of said body having a neck provided with an attaching and retaining shank which is adapted to be operatively joined to the lower valved end of a tree injector barrel, said body having a lower portion which is progressively widened and which is concavo-convex in cross section and terminates at a leading bark cleaving end in a feathered cutting edge, the concave side of said body providing the front and the convex side the back, the aforementioned bore having a discharge end communicating with the concave portion of said concave front, a limited front portion of said neck downwardly of said shank having a flattened inclined portion aligned with the upper portion of the concavity in said concave front, said inclined portion constituting an impact control and bit landing abutment which, in practice, takes the strain imposed on the bit, guides and controls the stroke thereof and minimizes the likelihood of the bit glancing sidewise or rebounding in an uncontrolled undesirable manner.

References Cited in the file of this patent
UNITED STATES PATENTS
2,870,576    Parker _____ Jan. 27, 1959